(12) United States Patent
Boenisch et al.

(10) Patent No.: US 10,168,995 B2
(45) Date of Patent: *Jan. 1, 2019

(54) EXTRACTING ENTROPY FROM MACHINE VIBRATION

(71) Applicant: International Business Machines Corporation, Armonk, NY (US)

(72) Inventors: Volker Boenisch, Boeblingen (DE); Reinhard Buendgen, Boeblingen (DE); Franziska Geisert, Boeblingen (DE); Jakob Lang, Boeblingen (DE); Mareike Lattermann, Boeblingen (DE); Budy D. Notohardjono, Poughkeepsie, NY (US); Angel Nunez-Mencias, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/823,992

(22) Filed: Nov. 28, 2017

(65) Prior Publication Data
US 2018/0081636 A1    Mar. 22, 2018

Related U.S. Application Data

(63) Continuation of application No. 14/949,307, filed on Nov. 23, 2015, now Pat. No. 9,880,812, which is a continuation of application No. 14/255,145, filed on Apr. 17, 2014.

(51) Int. Cl.
*H04L 9/08* (2006.01)
*H04L 9/00* (2006.01)
*G06F 7/58* (2006.01)
*G09C 1/00* (2006.01)

(52) U.S. Cl.
CPC ............... *G06F 7/588* (2013.01); *G09C 1/00* (2013.01); *H04L 9/0869* (2013.01); *H04L 2209/24* (2013.01)

(58) Field of Classification Search
None
See application file for complete search history.

(56) References Cited

U.S. PATENT DOCUMENTS

| 8,725,498 | B1* | 5/2014 | Sung ................... G10L 25/48 |
| | | | 704/207 |
| 2003/0126287 | A1* | 7/2003 | Charny ............... H04L 41/0896 |
| | | | 709/239 |
| 2007/0057779 | A1* | 3/2007 | Battista ................... G01S 19/34 |
| | | | 340/425.5 |

(Continued)

OTHER PUBLICATIONS

List of IBM Patents or Patent Applictions Treated As Related; (Appendix P), Filed Nov. 28, 2017, 2 pages.

*Primary Examiner* — Alexander Lagor
(74) *Attorney, Agent, or Firm* — Cantor Colburn LLP

(57) ABSTRACT

Generating a pool of random numbers for use by computer applications. Vibration sensors are placed throughout a machine and collects information theoretic entropy data from the measurement of the vibration sensors. The data is then filtered and added to an entropy pool. Applications needing a random number may acquire a number from the pool. A method, computer program product and system to generate the pool are provided.

10 Claims, 4 Drawing Sheets

(56) References Cited

U.S. PATENT DOCUMENTS

| | | | |
|---|---|---|---|
| 2008/0052348 A1* | 2/2008 | Adler | H04L 67/306 709/203 |
| 2011/0251785 A1* | 10/2011 | Koppel | G01C 21/343 701/533 |
| 2012/0173599 A1* | 7/2012 | Gao | G06F 7/582 708/254 |
| 2013/0029743 A1* | 1/2013 | Caughill | G07F 17/326 463/17 |
| 2013/0249719 A1* | 9/2013 | Ryan | G06F 5/06 341/118 |
| 2014/0136583 A1* | 5/2014 | Hyde | G06F 7/588 708/250 |
| 2015/0304107 A1 | 10/2015 | Boenisch et al. | |
| 2016/0077805 A1 | 3/2016 | Boenisch et al. | |

* cited by examiner

TYPICAL ACCELERATION DATA-STOCHASTIC     210

| TIME (SECONDS) | ACCELERATION X | ACCELERATION Y | ACCELERATION Z |
|---|---|---|---|
| 0.000000E+00 | 2.406687E-02 | 3.726784E-02 | 3.429187E-02 |
| 4.882813E-04 | -1.389308E-02 | 2.020082E-02 | 5.071933E-02 |
| 9.765625E-04 | 1.500052E-02 | 1.566827E-02 | -3.395921E-02 |
| 1.464844E-03 | -9.093975E-03 | -3.003651E-02 | 4.541209E-02 |
| 1.953125E-03 | 2.743000E-03 | -1.053846E-02 | -2.546139E-02 |
| 2.441406E-03 | -9.885581E-03 | 3.198297E-02 | -6.342844E-03 |
| 2.929687E-03 | -8.061178E-03 | 9.991701E-03 | 7.498902E-02 |
| 3.417969E-03 | 3.024510E-02 | -2.224599E-02 | -3.227183E-03 |
| 3.906250E-03 | 4.485809E-04 | -4.812146E-03 | -4.694478E-03 |
| 4.394531E-03 | -8.129206E-03 | -8.169592E-03 | 3.444796E-02 |
| 4.882812E-03 | 1.666412E-02 | -1.669377E-02 | -9.191425E-02 |
| 5.371094E-03 | 3.392364E-03 | 2.482042E-02 | 1.180963E-01 |
| 5.859375E-03 | 2.046136E-02 | -1.228557E-02 | -9.003487E-02 |
| 6.347656E-03 | 4.562890E-02 | 1.459264E-02 | 2.041188EE-02 |
| 6.835937E-03 | -6.610194E-02 | -4.809210E-02 | 4.546360E-03 |
| 7.924219E-03 | 1.511802E-02 | -4.526142E-03 | 1.604121E-02 |
| 7.812500E-03 | -2.064647E-02 | 2.416758E-02 | 7.724459E-03 |
| 8.300781E-03 | 2.767857E-02 | 4.504592E-02 | 5.914847E-02 |
| 8.789062E-03 | 1.069616E-02 | -3.888400E-02 | -1.449367E-01 |
| 9.277344E-03 | -2.930465E-02 | 3.307897E-03 | 1.240279E-01 |
| 9.765625E-03 | -3.216804E-02 | -2.194788E-02 | -9.604765E-02 |
| 1.025391E-02 | 2.948442E-02 | 7.380803E-02 | 7.061835E-02 |

FIG.2

EXTRACTING ENTROPY FROM MACHINE VIBRATION

DOMESTIC PRIORITY

This application is a continuation of U.S. patent application Ser. No. 14/949,307, filed Nov. 23, 2015 which is a continuation of U.S. patent application Ser. No. 14/255,145, filed Apr. 17, 2014, the content of which is incorporated by reference in its entirety.

BACKGROUND

Random number generators are required by computing applications and many security relevant features of cryptography applications.

SUMMARY

In an embodiment, a method to utilize the vibration of a machine for random number generation is provided. The method includes: acquiring, by at least one sensor, analog vibration data from the machine; converting, by a computer processor, the analog vibration data to digital data form; filtering the digital data; and storing the filtered data within a memory unit to form a random number pool from which random numbers may be selected.

In another embodiment, a computer program product for random number generation is provided. The computer program product includes: computer readable storage medium having program code embodied therewith, the program code readable by a computer processor to perform a method. The method includes: acquiring, by at least one sensor, analog vibration data from the machine; converting, by a computer processor, the analog acceleration data to digital form; filtering the digital data; and storing the filtered data within a memory unit to form a random number pool from which random numbers may be selected.

In yet another embodiment, a computer system to generate random numbers is provided. The system includes: a computer processor; at least one sensor in communication with the processor for acquiring analog vibration data from the system; the computer processor configured to: convert the analog vibration data to digital form; filter the digital data; and store the data within a memory unit to form a random number pool from which random numbers may be selected by a client.

BRIEF DESCRIPTION OF THE DRAWINGS

FIG. 2 depicts a sample of acceleration data.

DETAILED DESCRIPTION

Figure 1:
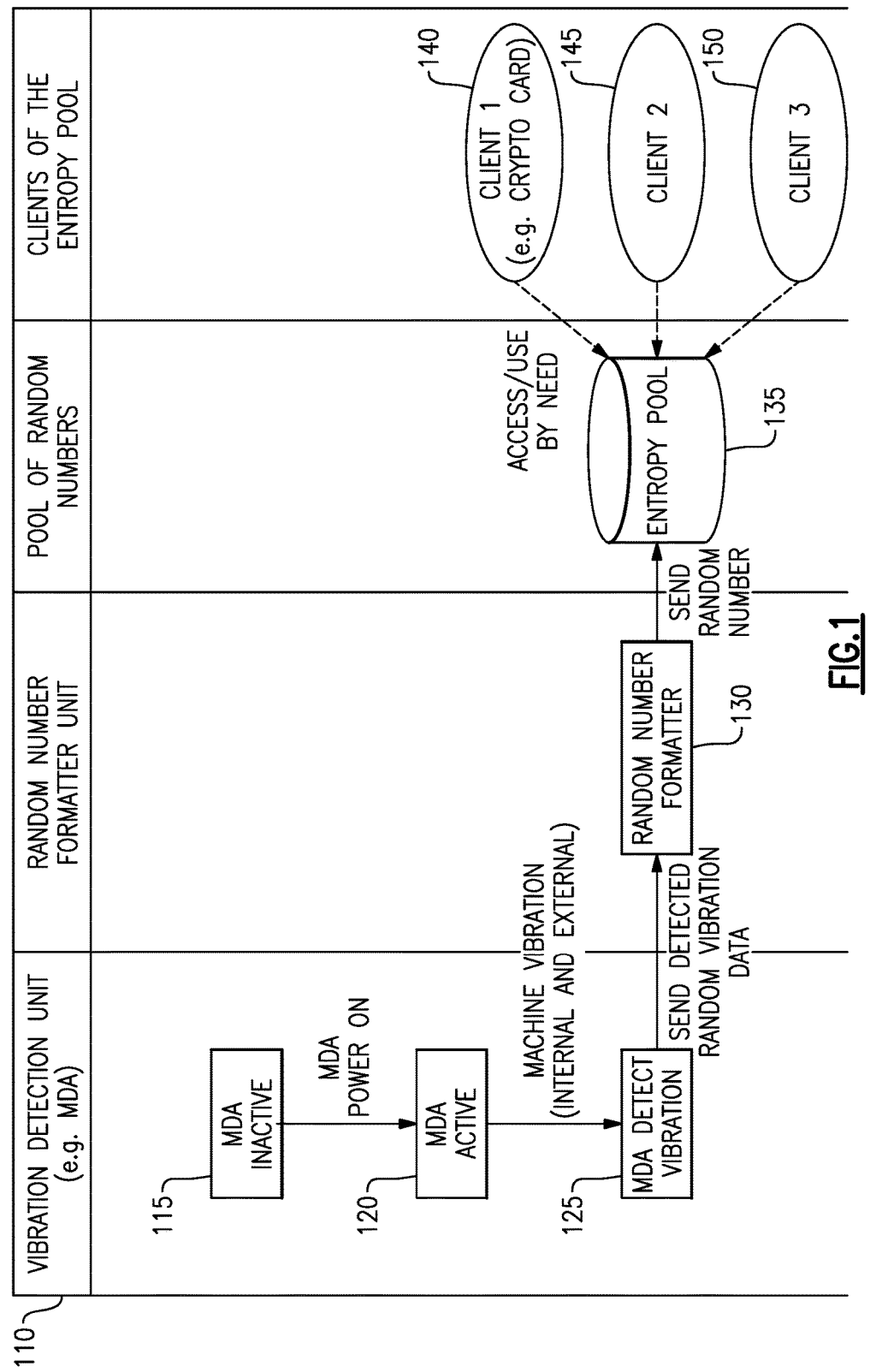
FIG. 1 depicts a flowchart utilizing a vibration detection unit on a machine to generate random numbers.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Current electronic systems require a constant flow of new random numbers for a number of various operations. Electronic security features often utilize random numbers to generate cryptographic keys, for example, in Secure Socket Layer "SSL" protocols, encryption and signatures, to generate unique initialization values and numbers used once, also known as "nonces" to keep encryption unique for each message.

Non aptly chosen random values may compromise security, which may break RSA keys of many appliances due to limited randomness of the keys generated by the devices, thereby making it easier to decipher the key(s).

Utilizing a good random number generator is important, and there exist several mechanisms that attempt to generate or retrieve random numbers. Information theory entropy (sometimes called Shannon entropy) defines the amount of randomness measured in bits. Computers typically collect randomness into an entropy pool from which requests for random numbers can be served. On machines such as servers, in this example, without interactive input output streams, there are little sources for random data. In particular, at system start up there is hardly any random data available. As described below, an embodiment enables a pre-collected pool of entropy values to be collected as a source of random numbers at machine startup. Software random number generators may not generate true random numbers. For example, pseudo random number generators are completely deterministic and not random.

Quantum mechanics may generate true random numbers. Use of quantum mechanics as a source for random number generation is further discussed in "The Physics of Quantum Mechanics, Binner and Skinner, copyright 2008" which is hereby incorporated by reference.

A noise-generator diode may be used in random number generation but reliability may be uncertain because it is difficult to confirm that the diode is still issuing random noise after it is exposed to temperature extremes such as heat or cold or other environmental factors such as exposure to radiation. Furthermore, though the diode itself is a simple component the circuitry to ensure its proper working makes it complex. Another mechanism employed to generate random numbers is the timing of input output "I/O" events such as interrupts. However, only few interrupt types qualify as non-forgeable sources of randomness. For example, for some Linux implementations, only disk I/O is considered non-forgeable I/O. Such I/O events are also scarcely available at system startup.

Pseudo random number generators utilizing software are sometimes employed as random number generators but in reality do not generate randomness. While the results may appear random they are completely deterministic if the seed can be determined. In other words, one can recreate the "random number" with the "seed" that was used. This is because the pseudo random number generator (PRNG) is only a deterministic algorithm that is used with a number (the so called "seed") as input value. The return value of the algorithm is the pseudo random number. So if one knows the algorithm and the seed the "random" number can be reproduced.

Disclosed is a method to utilize machine vibration measurements for random number generation. In the examples that follow, the machine selected is a server. However, other machines ranging from a laptop to an automobile may be used. The vibrations may be generated by moving components internal to the machine frame such as cooling fans or come from an external source such as external vibration. The method utilizes accelerometer sensors physically attached to the machine to measure the vibration and uses the measured vibration data as real random data. In an embodiment, the vibration of a mainframe computer is used as entropy input for an entropy pool maintained by the system. The data may be stored in a Motor Drive Assembly "MDA" or additional chip such as a smartcard. The collected random data is preferably stored in a non volatile memory pool so that the data is immediately available when needed.

In one embodiment, vibration data is collected during the manufacturing process and shipment process of a machine, in this case, a mainframe server, to fill an initial entropy pool. The machine thus arrives at a location with an initial entropy pool populated. Values from the entropy pool are then used and replenished while the machine is powered on.

The collection during manufacturing means that the vibration data is collected during the manufacturing work such as the installation and verification of the setup for a customer before the machine is shipped. With this collected data the random pool is prefilled for customer usage and the customer can directly use random data at system startup without needing to wait.

After the machine is setup and operational, entropy data is fed continuously into the entropy pool by continuously measuring machine vibrations during operation.

In an embodiment, vibration sensors are installed on the machine, in this example, a server. The vibration sensors may be installed in motor drive assemblies "MDAs". MDAs may also perform other functions such as controlling power on and off and adjusting the rotation speed of cooling units.

The MDA is connected to a processor and related circuitry which polls vibration measurements at periodic intervals. The processor then analyzes the vibration measurements. When the machine is powered on and no vibration is read from one sensor, different options are available. For example, failure switching may occur in which case the processor then attempts to collect vibration data from other acceleration sensors. In another example, the processor may also indicate an exception and/or send out an alert.

If vibration measurements are able to be recorded, entropy measurements contained in the vibration measurements are fed into an entropy pool using a first in, first out "FIFO" structure. As such, once a given number in the entropy pool is selected it is no longer available in the pool and must be replaced by another entropy value. Other orders such as last in first out "LIFO" may be used, and using the FIFO queue is just an example for a possible embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented
process such that the instructions which execute on the computer or other programmable apparatus provide processes for implementing the functions/acts specified in the flowchart and/or block diagram block or blocks.

Referring now to FIG. 1, vibration detection unit (vibration sensor) 110 monitors all movements of the machine in terms of a vibration. In this example, the vibration detection unit is part of a motor drive assembly (MDA). The MDA is initially inactive in 115 and is powered on to active status 120. In 125, the MDA detects vibration. The vibration can originate from within or outside the machine. The raw data is processed by the computer processor random number formatter 130 where the data is converted from analog to digital form and filtered, such as removing leading zeros as described above. After a number is filtered, it is added to entropy pool 135, managed by the computer processor. Client applications as depicted by 140, 145 and 150 can then access the entropy pool to select a random value. The vibration sensor can be integrated into a MDA for example. After turning on the sensor it will continuously collect vibration data and send it to a random number formatter, which will translate the raw data into a random number. This random number will be stored in an entropy pool until it gets used by any client which needs a true random number, for example the Crypto Card.

A system interface may utilize software to extract entropy from the entropy pool. Entropy polling works in two modes, coarse grained and fine grained.

During manufacturing, initial entropy input is collected in the entropy pool in "coarse grained" mode but no entropy is consumed, that is, no random numbers are used. Manufacturing mode is meant to be used while the hardware is not yet in normal operation but experiences strong vibration from the environment like during earth quake resistance testing or shipment of the hardware. Since in this situation vibration measurements differ a lot, a larger range of bits (medium to low significant bits) can be extracted at rather long time intervals and fed into the entropy pool. Once the pool is full no further entropy data needs to be collected in "coarse grained" mode.

Once the system is started in normal operation entropy collection enters "fine grained mode". In that mode, vibration mainly stems from air moving devices and fluctuation between vibration values is comparatively small. Therefore only bits with low significance will be extracted from the vibration measurements and fed into the entropy pool. During normal operations entropy will not only be fed into the entropy pool but programs will also consume entropy, hence the pool must continuously be refilled. During phases where the entropy pool is and remains full entropy generation may pause.

Raw data that is collected is formatted prior to being added to the entropy pool. In an embodiment, leading 0s are removed from raw data measurement. For example, if a collected raw data reading is 0.000312456 g where g is gravitational acceleration, formatting the data involves ignoring all leading 0s when storing the entropy value; only "312456" is stored since the rest is predictable and so not useful. It is also possible to delete additional predictable parts of the raw data. This is done to remove the unwanted predictable part of the number.

FIG. 2. is an example of obtained stochastic acceleration data (also called vibration data) that may be filtered and fed into the entropy pool in memory. The value shown by 210 corresponds to a recorded measurement of 0.03429187. Dropping leading zeros and using non zero digits yield a filtered value of 3429187 to be added to the entropy pool.

Figure 3:
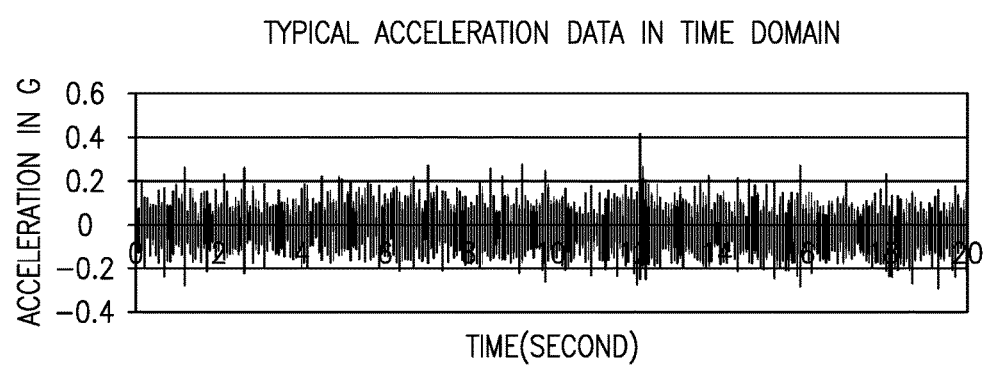
FIG. 3 depicts acceleration data in the time domain.

As an example, vibration magnitude data can be shown in a time domain or a frequency domain. Typical vibration magnitude—acceleration in G (Gravitational acceleration) vs. time in second is shown in FIG. 3.

Figure 4:
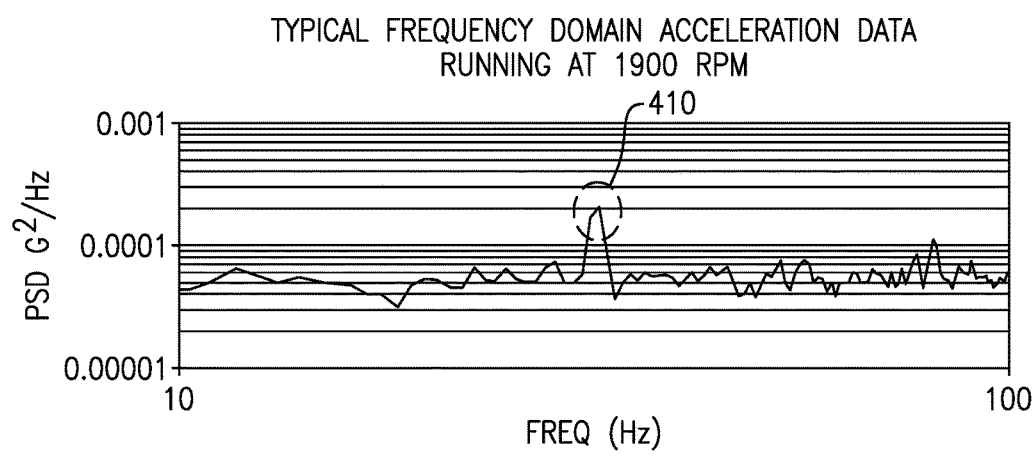
FIG. 4 depicts frequency domain acceleration data.

A chart showing typical data in the frequency domain is show in FIG. 4. As shown in the example, a fan spinning at 1900 rpm is expected to have a frequency of 31.6 Hz, which would appear as a peak 410.

Utilizing time domain vibration data is preferred because the acceleration magnitude of cooling components in a server rack as a time domain data cannot be predicted. This is due to the fact that the magnitude depends on all fans operating at different phase angles as a result of cooling components starting at different times so even though they are running at similar rotation speeds the phase difference makes the future value unpredictable. The sensor will detect adjacent fans running at different frequencies.

The processor may utilize three axis data i.e. one in the vertical direction and two horizontal directions to obtain additional unpredictable vibration data.

Other factors such as server component temperatures (e.g. Bulk Power Fan (BPF), Radiator fans, IO fans) may affect speed and add unpredictable nature of vibration data. The vibration data is hard to predict and therefore provides a reliable source of randomness due to fans moving there will always be some level of vibration within the server rack.

Broken sensor parts can be detected quickly since a broken sensor will deliver close to zero vibration. Once the processor detects a broken sensor the data from that sensor can be ignored, an exception can be raised, or the processor can attempt to poll another sensor to obtain data.

This disclosure provides a method, an apparatus and a system to acquire random numbers and maintain a continuous pool of random numbers. The embodiment may also be implemented as a computer system such as a random number server to provide continuous random numbers to other computer systems or implemented in a multi computer system environment, providing continuous random numbers to other computer systems in a random number cloud/cluster configuration. The aforementioned are examples and other implementations are feasible.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are
open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to explain the principles of the invention and the practical application, and to enable others of ordinary skill in the art to understand the invention through various embodiments and the various modifications thereto which are dependent on the particular use contemplated.

The invention claimed is:

1. A computer-implemented method for random number generation for security relevant features of cryptography applications, the computer-implemented method comprising:
   acquiring, by at least one sensor, analog vibration data from the machine, wherein the sensor is configured to monitor the vibration of a cooling component of the machine, wherein the analog vibration data is acquired from a motor drive assembly installed in the machine;
   converting, by a computer processor, the analog vibration data to digital form;
   filtering the digital data; and
   storing the filtered data within a memory unit to form a random number pool from which random numbers may be selected, wherein the analog vibration data is collected in a first mode and a second mode.

2. The computer-implemented method according to claim 1, wherein the analog vibration data is acquired during manufacturing of the machine, thereby forming the random number pool before the machine is completely manufactured.

3. The computer-implemented method according to claim 1, wherein the analog vibration data is acquired while the machine is powered on.

4. The computer-implemented method according to claim 1, wherein in response to one of the at least one sensor detecting no vibration, vibration data is acquired by another sensor.

5. The computer-implemented method according to claim 1, wherein the at least one sensor comprises a tri-axial accelerometer installed in a motor drives assembly of a rotating component within the machine.

6. The computer-implemented method according to claim 1, wherein filtering comprises removing non random parts of numbers.

7. The computer-implemented method according to claim 1, wherein the analog vibration data is acquired during shipment of the machine.

8. The computer-implemented method according to claim 1, wherein the cooling component is a cooling fan.

9. The computer-implemented method according to claim 1, further comprising pausing random number generation based at least in part on a fill level of the random number pool.

10. The computer-implemented method according to claim 1, wherein the first mode is a coarse grained mode and the second mode is a fine grained mode.

* * * * *